United States Patent Office 3,184,628
Patented May 18, 1965

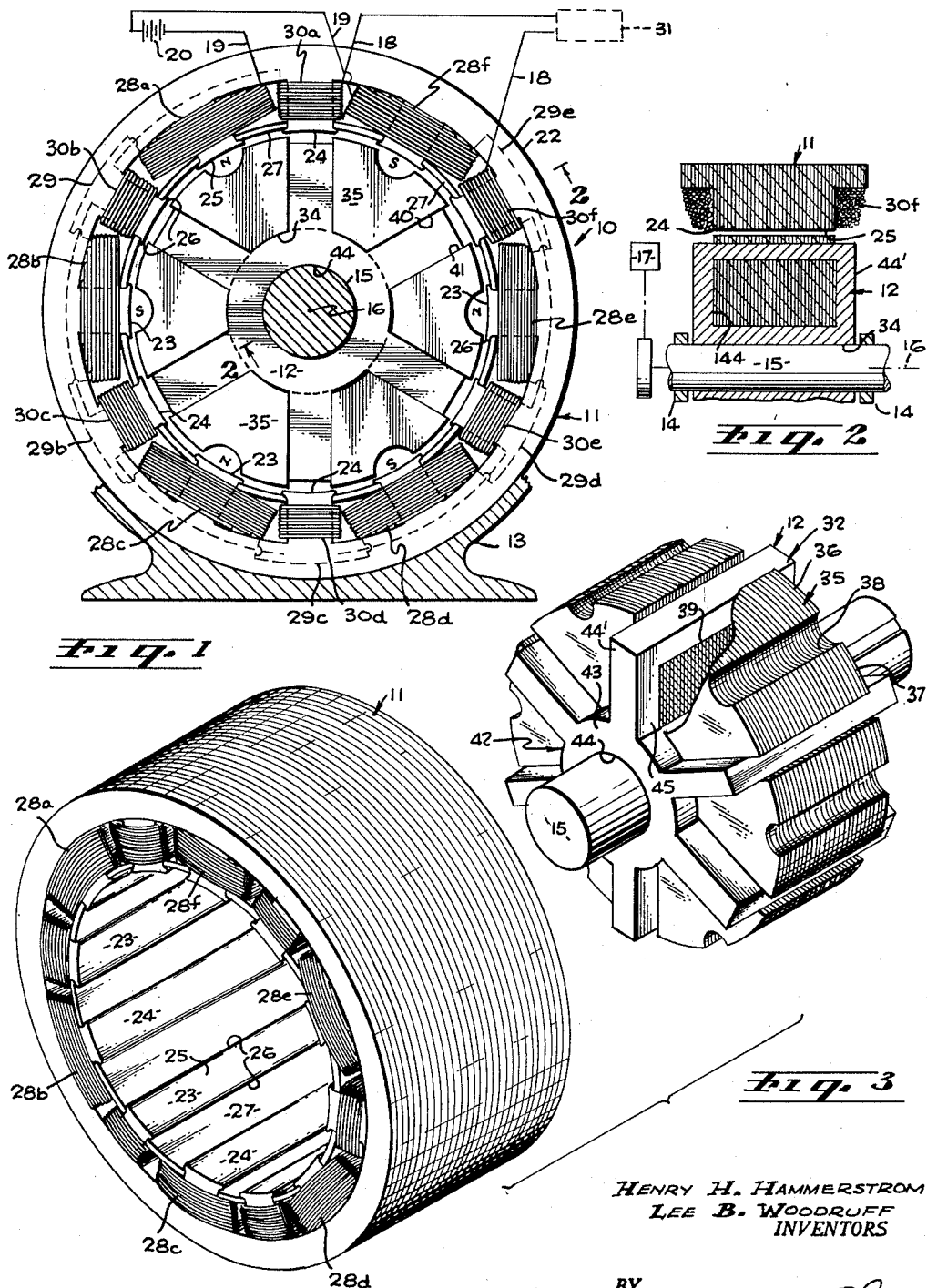

3,184,628
VARIABLE RELUCTANCE GENERATOR HAVING A ROTOR WINDING
Henry H. Hammerstrom, 4759 Mendota Ave., Los Angeles 42, Calif., and Lee B. Woodruff, 5132 Arlington Ave., Los Angeles 43, Calif.
Filed Apr. 2, 1962, Ser. No. 184,395
4 Claims. (Cl. 310—168)

This invention relates to an improved electrical generator which is particularly adapted in certain respects for use as an alternator, that is for generating alternating current.

A major object of the present invention is to provide an alternator which is capable of generating current with greater efficiency than has been possible with prior conventional units for this purpose. Particularly contemplated is an alternator structure which is adapted to produce a very substantial electrical output over a much wider range of operating speeds than can be attained with other alternators. As a result, a unit embodying the invention may be employed very effectively as an automobile alternator, where the unit must develop a high enough output at idling speed to handle the electrical load of the vehicle without drain on the battery, and yet must not produce an excessive output when the engine reaches a very high speed. As is well known, with most conventional alternators or generators, the variation between the outputs at idling speed and high speed is so great as to make it very difficult to properly satisfy the requirements of the electrical system at all speeds by the same generating device.

A further object of the invention is to provide an alternator having the above discussed advantages, and in which there is no necessity for an electrical connection of any type between the rotor and the stator of the device. Thus, brushes, slip rings and commutators are completely eliminated, together with the difficult maintenance problems which necessarily accompany their use. All windings which are in any way connected to an external circuit are carried by the stator, and therefore may have permanent connections to that circuit. Further, the rotor is structurally extremely simple in design, and relatively inexpensive to manufacture as compared with the usual type of wire-wound rotor employed in generators and alternators. The only windings employed on the rotor may be very heavy windings of few turns, desirably formed by merely casting into the iron of the rotor a number of loops of an aluminum alloy or other highly conductive material.

The stator of the device has at least one exciting pole, and preferably several such poles spaced circularly about the axis of the generator, with these poles being alternately of North and South magnetic polarity. Desirably, the exciting pole or poles are energized by a winding or windings through which direct current exciting energy may be passed. At a location offset from each exciting pole, the stator forms an output pole, in which magnetic polarity is developed as the rotor turns. An output winding is disposed about each such output pole, so that output current is generated in this winding, and may be fed to an external circuit to be energized.

The rotor which coacts with the above discussed stator includes magnetic metal forming a plurality of circularly spaced poles, within which magnetic polarity is generated as the rotor turns, with the rotor having connecting portions of magnetic metal extending between successive rotor poles. The rotor windings form closed loops or windings extending along an endless path about the mentioned connecting portions of magnetic metal, so that radially inner portions of these loops or windings are disposed at the radially inner sides of such portions, and outer portions of the windings are disposed at the radially outer sides of the connecting portions. For optimum results, each such winding takes the form of a single closed loop. Also, the radially inner portions of the closed or endless windings are desirably electrically connected together, preferably by forming them integrally as a single conductive sleeve within the interior of the magnetic metal. Thus, the sleeve and the outer portions of the loops may all be cast integrally as discussed above to attain maximum simplicity of manufacture, while still achieving optimum operating characteristics.

The above and other features and objects of the present invention will be better understood from the following detailed description of the typical embodiment illustrated in the accompanying drawing, in which:

FIG. 1 is a side view of an alternator constructed in accordance with the invention, with the housing and housing structure being removed to illustrate clearly the manner of formation of the rotor and the stator;

FIG. 2 is a section taken on line 2—2 of FIG. 1; and

FIG. 3 is an exploded perspective view, partially broken away, showing the stator and rotor of the device.

Referring first to FIG. 1, I have illustrated at 10 an alternator having a stator 11 and rotor 12. The stator may be mounted within a suitable housing represented at 13, carrying the usual bearings 14 (FIG. 2) journalling the rotor shaft 15 and the other portions of the rotor for rotation about an axil 16. The rotor is power-driven by a suitable engine or other power unit represented at 17 in FIG. 2, and as a result of such rotation acts to produce an alternating current output in two output leads 18 (FIG. 1). A direct current exciting voltage is supplied to the exciting windings of the stator through leads 19, from a power source typically represented as a battery 20.

The stator is formed of a series of identical planar abutting laminations, each of which is disposed transversely of axis 16, and has the configuration illustrated in FIG. 1. More particularly, these laminations have an outer annular main portion 22, centered about axis 16, carrying integral projections forming six evenly circularly spaced radially inwardly projecting exciting poles 23, and six evenly circularly spaced intermediate output poles 24. Each of these various poles 23 and 24 may have its electrical center spaced 30 degrees from both of the two adjacent poles. Also, the magnetic metal of the output poles may typically be shaped identically with the magnetic metal of the exciting poles, as shown. Desirably, all of the various poles 23 and 24 have inner arcuately curved pole faces 25, curved cylindrically about axis 16, and all spaced a common radial distance from that axis. Each of the poles may have small flanges or enlargements 26 at its opposite sides, to allow reception of retaining elements 27 between poles, in a manner such that they are retained against radially inward movement by the lugs 26, and serve in turn to retain the various later-to-be-described windings against radially inward movement toward the rotor. About the various exciting poles 23, there are wound a series of exciting windings 28a, 28b, 28c, 28d, 28e and 28f, each consisting of a predetermined number of turns of insulated wire or other highly conductive material. These coils 28a, 28b, etc. are connected in series to the direct current power source 20, with alternate ones of the exciting coils 28a, 28b, etc. being connected reversely with respect to one another, so that successive ones of the poles 23 have different magnetic polarities. In FIG. 1, the first exciting winding 28a is connected directly to power source 20 by one of the leads 19, and is connected at its opposite side to one end of the second exciting winding 28b by a conductor 29. Similarly, the second side of coil 28b is connected by conductor 29b to coil 28c, with the rest of the exciting windings being similarly connected in the same series circuit by conductors 29c, 29d and 29e. The current in coils 28a, 28c and 28e flows about the corresponding poles 23 in a first direction (as viewed from axis 16), while the intermediate coils 28b, 28d and 28f contain current which flows in the opposite direction about their respective poles, so that alternate poles have alternate magnetic polarity. For example, the poles 23 within coils 28a, 28c and 28e may have North magnetic polarity, while the intermediate coils produce South polarity in their respective poles 23.

The output poles 24 have similar individual windings 30a, 30b, 30c, 30d, 30e and 30f extending about them, and connected in series to the previously mentioned output leads 18, which may be connected to a unit represented at 31 to be energized by the alternating current produced by the device. As in the case of coils 28a, 28b, etc., alternate ones of the coils 30a, 30b, etc. are connected reversely with respect to one another, in their series circuit. That is, coils 30a, 30c, and 30e may extend about their respective poles 24 in a first direction (as viewed looking radially outwardly from axis 16), while the intermediate coils 30b, 30d, and 30f extend about their poles in the opposite direction. For best operation, it is found desirable that the exciting windings 28a, 28b, etc. each have many more turns than do output windings 30a, 30b, etc., preferably at least two times as many turns, and for best results at least about three times the number of turns.

The rotor 12 of the alternator includes a magnetic body formed of a large number of identical planar laminations extending transversely of axis 16 and having the configuration represented in FIG. 3. More particularly, each of these laminations has an inner circular edge 34, centered about axis 16, and extending entirely thereabout. The radially outer edges of the disks or laminations may be defined as forming six evenly circularly spaced rotor poles 35, each having two cylindrically curved pole faces 36 and 37 centered about axis 16 and of a diameter to pass poles 23 and 24 in closely spaced relation. Between the two pole faces 36 and 37 of a particular one of the poles 35, there may be a groove 38 formed in that pole, of a circular extent approximating the circular extent of stator poles 23 and 24. Similarly, the rotor pole faces 36 and 37 may have a circular extent approximating that of poles 23 and 24.

Between the locations of the successive rotor poles 35, laminations 33 are of reduced external diameter, to present radially outer edges 39, forming radially outwardly facing axially extending grooves in the outer surface of the magnetic metal body. In extending outwardly from edges 39 to the diameter of surfaces 36 and 37, the laminations may form generally radially extending edges 40 and 41.

The windings on the rotor are formed by an integral one piece body 42 of electrically conductive material cast in place within magnetic metal body 32, and about rotor shaft 15. More particularly, the conductive material 42 may be cast aluminum or a highly conductive cast aluminum alloy. Radially between shaft 15 and the inner circular edges 34 of laminations 33, the conductive material 42 forms a tube or sleeve 43, having an inner cylindrical surface 44 continuously engaging and tightly bonded to shaft 15, and having an outer cylindrical surface 45 engaging and bonded to the inner edges of the laminations. At each of the two opposite ends of sleeve 43, and at the opposite ends of the laminations, part 42 forms a series of circularly spaced radially outwardly projecting conductive bars or rods 44; typically of square or rectangular cross-section, and bonded at their axially inner sides 144 (FIG. 2) to the end laminations of the rotor. These bar portions 44 of conductive material 42 are located circularly between the positions of successive rotor poles 35, and at their radially outer ends are integrally connected with further portions 45 of conductive material 42, which extend axially within the grooves formed within the laminations at 39. These portions 45 may also be of square or rectangular cross-section, and each form with the two connected portions 44' of part 42, and the adjacent portion of inner sleeve 43, a closed highly conductive loop or single turn endless winding, as will be clearly apparent from FIG. 2. During operation of the alternator, current flows about each of these endless loops, which, it is noted, are disposed about "connecting portions" of the rotor magnetic material extending between successive poles 35.

In order to produce alternating current with the illustrated unit, it is necessary merely to connect the appropriate direct current power source 20 to exciting windings 28a, 28b etc. and to then drive shaft 15 rotatively about axis 16 by means of power unit 17. As the rotor turns, magnetic polarities are developed in rotor poles 35, and currents flow within the conductive loops or windings formed about the portions of the rotor magnetic material extending between successive poles 35, while the movement of the poles past stator poles 24 produces an alternating current in the coils disposed about those poles, which current may be tapped from the device through leads 18.

To assure adequacy of the present disclosure, the following structural details are given of one specific alternator which has been built in accordance with the invention, and has operated very successfully. FIG. 1 illustrates this device, substantially exactly to scale, at three-fourths of the actual size. In the illustrated alternator, the stator windings have the following numbers of turns:

(1) Windings 28a, 28b, 28c, 28d, 28e and 28f—105 turns each of #18 B. & S. gauge enameled copper wire (all of these coils are actually preformed of a single continuous wire forming the coils and also their connectors 29, 29b, etc.).

(2) Windings 30a, 30b, 30c, 30d, 30e and 30f—34 turns of #17 B. & S. gauge enameled copper wire (all of a preformed single continuous wire).

We claim:

1. A generator comprising a stator, a rotor adapted to be driven rotatively about an axis relative to the stator, and to generate electricity by virtue of said rotation, said stator including means forming at least one magnetic exciting pole, said rotor including a shaft, a generally annular body of magnetic material disposed about said shaft and forming circularly successive rotor poles movable successively past said exciting pole of the stator, said magnetic material also forming connecting portions of the rotor made of magnetic material extending between successive ones of said rotor poles and each defining a flux path along which magnetic lines of force flow from one rotor pole to another, said magnetic material of the rotor carrying conductive material forming windings on the rotor, said conductive material forming an inner sleeve disposed essentially annularly about said shaft radially between said shaft and said body of magnetic material and forming also a plurality of of loops projecting generally radially outwardly from said sleeve at circularly spaced locations, individual ones of said loops forming with said sleeve an endless closed winding extending about one of said connecting portions of the magnetic material of the rotor and through which current may flow along a closed path extending first generally axially through said sleeve at the radially inner side of said connecting portion, then radially outwardly at one end of said connecting portion, said stator including magnetic material forming side of said connecting portion, and then radially inwardly and back to said sleeve at the second end of said connecting portion, said stator including magnetic material forming at least one output pole offset circularly from said exciting pole and past which said rotor poles and windings rotate, said stator having an output winding disposed about said output pole and connectable to a unit to be energized and adapted to supply electrical energy thereto in response to rotation of the rotor poles and windings past said output pole.

2. A generator comprising a stator, a rotor adapted to be driven rotatively about an axis relative to the stator, and to generate electricity by virtue of said rotation, said stator including magnetic material forming a plurality of evenly circularly spaced exciting poles, said stator including exciting windings about said poles to be connected to a source of direct current and adapted to energize alternate ones of said poles as North magnetic poles, and to energize the intermediate poles as South magnetic poles, said rotor including a shaft, a generally annular body of magnetic material disposed about said shaft and forming circularly successive rotor poles movable successively past said exciting poles of the stator, said magnetic material also forming connecting portions of the rotor made of magnetic material extending between successive ones of said rotor poles and each defining a flux path along which magnetic lines of force flow from one rotor pole to another, said magnetic material of the rotor having an integrated mass of conductive material cast therein forming windings on the rotor, said conductive material forming an inner sleeve disposed essentially annularly about said shaft radially between said shaft and said body of magnetic material, and forming also a plurality of loops integral with said sleeve and projecting generally radially outwardly therefrom at circularly spaced locations, individual ones of said loops forming with said sleeve an endless single turn closed winding extending about one of said connecting portions of the magnetic material of the rotor and through which current may flow along a closed path extending first generally axially through said sleeve at the radially inner side of said connecting portion, then radially outwardly at one end of said connecting portion, then generally axially at the radially outer side of said connecting portion, and then radially inwardly and back to said sleeve at the second end of said connecting portion, said stator including a plurality of output poles each located circularly between two of said exciting poles and past which said rotor poles and windings rotate, said stator having output windings disposed about said output poles and connectable to a unit to be energized and adapted to supply electrical energy thereto in response to rotation of the rotor poles and windings past said output poles, the electrical centers of said exciting poles and adjacent ones of said output poles of the stator being spaced apart circularly substantially the same distance as are the centers of said conductive loops of the rotor.

3. A generator as recited in claim 2, in which said conductive material forming said sleeve and loops is a cast aluminum alloy.

4. The combination of a stator and a rotor mounted to turn relative thereto, said rotor including a shaft, a generally annular body of magnetic material disposed about said shaft and forming circularly successive rotor poles, said magnetic material also forming connecting portions of the rotor made of magnetic material extending between successive ones of said rotor poles and each defining a flux path along which magnetic lines of force flow from one rotor pole to another, said magnetic material of the rotor carrying conductive material forming windings on the rotor, said conductive material forming an inner sleeve disposed essentially annularly about said shaft radially between said shaft and said body of magnetic material and forming also a plurality of loops projecting generally radially outwardly from said sleeve at circularly spaced locations, individual ones of said loops forming with said sleeve an endless closed winding extending about one of said connecting portions of the magnetic material of the rotor and through which current may flow along a closed path extending first generally axially through said sleeve at the radially inner side of said connecting portion, then radially outwardly at one end of said connecting portion, then generally axially at the radially outer side of said connecting portion, and then radially inwardly and back to said sleeve at the second end of said connecting portion.

References Cited by the Examiner
UNITED STATES PATENTS

| | | | |
|---|---|---|---|
| 427,978 | 5/90 | Dolivo-Dobrowolsky | 310—211 |
| 994,381 | 6/11 | Fynn | 310—211 |
| 2,247,489 | 7/41 | Gottlieb et al. | 310—163 |
| 2,732,509 | 1/56 | Hammerstrom et al. | 310—168 |

MILTON O. HIRSHFIELD, *Primary Examiner*.